United States Patent
Dore

[11] Patent Number: 5,563,249
[45] Date of Patent: Oct. 8, 1996

[54] ACIDIC MONOAZO DYESTUFFS

[75] Inventor: Jacky Dore, Basel, Switzerland

[73] Assignee: Sandoz Ltd., Basel, Switzerland

[21] Appl. No.: 493,078

[22] Filed: Jun. 21, 1995

[30] Foreign Application Priority Data

Jun. 21, 1994 [DE] Germany .......................... 44 21 693.9
Nov. 9, 1994 [DE] Germany .......................... 44 39 941.3

[51] Int. Cl.$^6$ .................... C09B 29/045; C09B 29/30; D06P 1/39; D06P 3/24
[52] U.S. Cl. ................ 534/752; 534/779; 8/684; 8/924
[58] Field of Search ................... 534/752, 779; 8/684, 924

[56] References Cited

U.S. PATENT DOCUMENTS 4,711,954  12/1987  Heidenreich et al. ............. 534/779 X

FOREIGN PATENT DOCUMENTS 1199243  7/1970  United Kingdom.
1263288  2/1972  United Kingdom.

OTHER PUBLICATIONS

Uehlinger, Hanspeter, Chemical Abstracts, 72:22573c (1970).

Primary Examiner—Fiona T. Powers
Attorney, Agent, or Firm—Robert S. Honor; Carl W. Battle; Hesna J. Pfeiffer

[57] ABSTRACT

Acidic monoazo dyestuffs of formula I

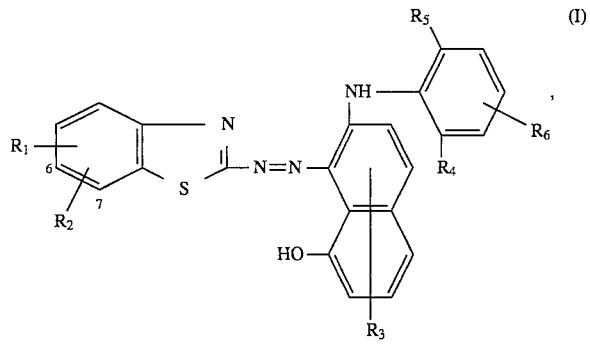

and their salts
wherein the symbols $R_1$ to $R_6$, which possess the significances given in claim 1. These dyestuffs are suitable for dyeing or printing textile material consisting of natural or synthetic polyamides.

10 Claims, No Drawings

ACIDIC MONOAZO DYESTUFFS

This invention relates to acidic monoazo dyestuffs, a method of preparing the same and their use in dyeing or printing fibrous materials consisting of natural and/or synthetic polyamides.

The invention provides in one of its aspects acidic monoazo dyestuffs of formula I

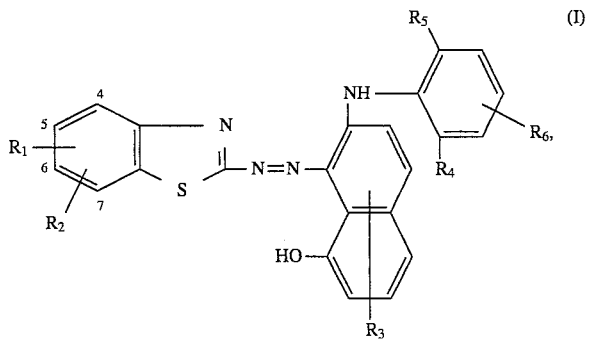

and their salts
wherein
- $R_1$ signifies hydrogen, halogen, cyano, thiocyano, nitro, acyl, acyloxy, acylamino, an optionally substituted alkyl or alkoxy group, or a sulphonic acid group,
- $R_2$ signifies hydrogen, halogen, alkyl, alkoxy, hydroxyalkoxy, a sulphonic acid group, or a divalent radical of formula —CH=CH—CH=CH— or —CH=CH—CH=CH— bearing an $R_1$ substituent which divalent radical is bonded at the 6- and 7-position to the benzothiazole moiety or
- $R_1$ and $R_2$ together form an unsubstituted iso- or heterocyclic 5- or 6-membered aliphatic ring, a 5- or 6-membered heteroaromatic ring or one of said rings substituted at carbon by an alkyl group having 1 to 4 carbon atoms, a halogen, a hydroxy group or =O, wherein any heterocyclic ring possesses from 1 to 3 heteroatoms,
- $R_3$ signifies hydrogen or a sulphonic acid group,
- $R_4$ and $R_5$, each independently of the other, signify alkyl or alkoxy,
- $R_6$ signifies hydrogen, halogen, cyano, thiocyano, nitro, acyl, acyloxy, acylamino, optionally substituted alkyl or alkoxy, or a sulphonic acid group, wherein the dyestuff bears only one sulphonic acid group.

Alkyl and alkoxy groups referred to above are preferably radicals with up to 8 carbon atoms, more preferably up to 4 carbon atoms, e.g., butyl and more preferably 1 or 2 carbon atoms; any substituents thereon may be halogen, hydroxy, cyano, alkoxy, acyl, acyloxy or acylamino. Those alkyl or alkoxy groups having 3 or more carbon atoms may be straight-chain, branched or cyclic, for example, cyclohexyl.

Preferred acyl radicals, also including those in acyloxy and acylamino groups are, for example, $C_{1-3}$-alkylcarbonyl, benzoyl, aminocarbonyl, phenylaminocarbonyl, N-$C_{1-3}$-alkyl-N-phenylaminocarbonyl, mono- or di-$C_{1-3}$-alkylaminocarbonyl, $C_{1-3}$-alkoxycarbonyl, $C_{1-3}$-alkylsulphonyl, aminosulphonyl, mono- or di-$C_{1-3}$-alkylaminosulphonyl, $C_{1-3}$-alkoxy-$C_{2-3}$-alkylaminosulphonyl, phenylaminosulphonyl or N-$C_{1-3}$-alkyl-N-phenylaminosulphonyl radicals.

Halogen is understood as a reference to F, Cl, Br or I, preferably Cl or Br.

The position of the sulphonic acid group in a dyestuff according to the invention is not essential, that is, it may be connected to the benzothiazole moiety as substituent $R_1$ or equally, it may be connected to the coupling component as substituent $R_3$ or $R_6$. If the sulphonic acid group is connected to the coupling component, it is preferably bonded as substituent $R_3$ in the 6-position of the naphthalene nucleus.

In preferred compounds according to the invention
- $R_1$ represents a methyl group, an alkoxy group having from 1 to 4 carbon atoms, i.e. methoxy, ethoxy, propoxy or butoxy, an amido group having from 1 to 8 carbon atoms, an alkoxycarbonylamino group having from 1 to 8 carbon atoms, a benzoylamino group, an alkylaminosulphonyl group having from 1 to 4 carbon atoms, a cyclohexylaminosulphonyl group or a phenylaminosulphonyl group,
- $R_2$ signifies a hydrogen atom, a methyl group, an alkoxy group having from 1 to 4 carbon atoms, i.e. methoxy, ethoxy, propoxy or butoxy, or a group of the formula —CH=CH—CH=CH— which is bonded in the 6- and 7-position to the benzothiazole moiety, or
- $R_1$ and $R_2$ together form a ring as hereinabove described which is connected to the benzothiazole ring at the 5- and 6-positions or the 6- and 7-positions,
- $R_3$ signifies a $SO_3H$ group which is preferably in the 6-position of the naphthalene nucleus,
- $R_4$ and $R_5$, independently of one another, signify methyl, ethyl, isopropyl or a t-butyl group, more preferably methyl, and
- $R_6$ signifies a hydrogen atom.

When $R_1$ is a methoxy or ethoxy group it is particularly preferred if it is in the 6-position of the benzothiazole moiety. Alternatively, if $R_2$ is methoxy or ethoxy in the 6-position and $R_3$ and $R_6$ are hydrogen, $R_1$ is preferably a $SO_3H$ group in the 4-, 5- or 7-position.

If $R_1$ and $R_2$ together represent a heterocycle, preferably it has 1 or 2 oxygen, nitrogen or sulphur atoms as hetero atoms, more preferably, one hetero atom is bonded at the 6-position of the benzothiazole.

A ring formed by $R_1$ and $R_2$ together is preferably an unsubstituted aliphatic heterocycle or a =O substituted aliphatic heterocycle, which heterocycles are bonded at the 5- and 6-positions referred to in the preceding paragraph, and in which the hetero-atoms are oxygen atoms and at least one oxygen atom is bonded to the carbon atom at the 6-position.

A particularly preferred dyestuff according to the invention has the formula

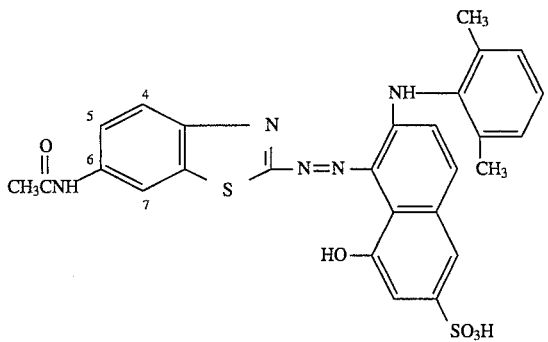

A particularly preferred dyestuff in which $R_1$ and $R_2$ together form a ring as aforesaid is represented by the formula

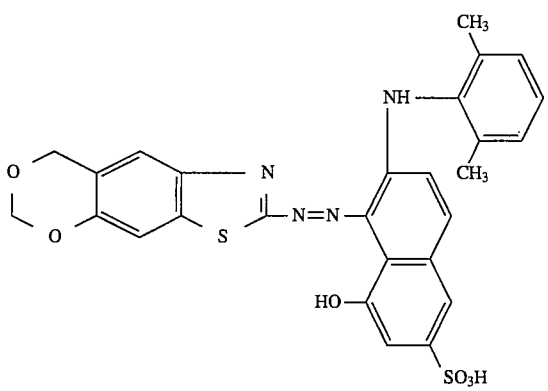

The invention provides in another of its aspects a process for the production of the dyestuffs according to the formula I wherein a diazotised amine of formula II

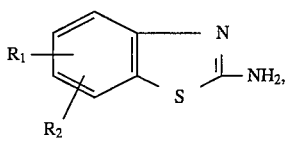

is coupled with a compound of formula III

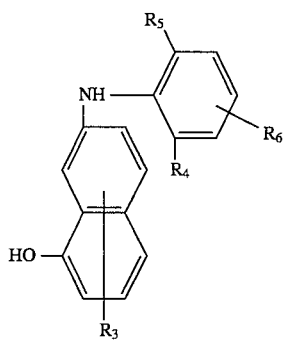

The compounds of formulae II and III are known starting materials, although they may also be readily synthesised from commonly available reagents via known syntheses. Diazotisation and coupling are effected in the usual manner. Preferably the amine II is diazotised at a temperature of from 0° to 20° C. and at a pH of from 0 to 2, more preferably 0 to 1. The coupling reaction is preferably carried out at a temperature of from 0° to 40° C. and at a pH of from 0 to 7, more preferably 0 to 4.

Dyestuffs according to the formula (I) may be isolated from the reaction medium according to known methods, for example, by salting out with an alkali metal salt, filtering and drying optionally in vacuo at a slightly elevated temperature.

Depending upon the reaction and/or isolation conditions, the dyestuffs according to the formula (I) may be obtained as the free-acid, salt or mixed salt form, containing, for example, one or more cations selected from the alkali metal cations, e.g., the sodium ion, or an ammonium ion or an alkylammonium cation, e.g., mono-, di-, or tri-methyl or ethylammonium cations. The dyestuffs may be converted from the free-acid form to a salt or mixed salt form or vice-versa or from one salt form to another according to conventional techniques.

Dyestuffs according to the formula (I) and their salts are particularly suitable for dyeing or printing fibrous materials consisting of natural and synthetic polyamides to blue to marine-blue shades.

The invention therefore provides in another of its aspects the use of dyestuffs according to formula (I), their salts or mixtures therof in dyeing or printing fibrous materials consisting of natural and/or synthetic polyamides.

Dyeing is effected according to known processes, see for example, processes described in DE-OS 34 34 281. Preferably dyeing is carried out using the Exhaust Dyeing process at a temperature of from 30° to 100° C., more preferably, 80° to 100° C. and with a goods to liquor ratio of from 1:40.

In yet another aspect of the invention there is provided a process of dyeing or printing fibrous materials consisting of natural and/or synthetic polyamides with dyestuffs according to formula I, their salts or mixtures thereof.

The substrate to be dyed may be present, for example, in the form of yarn, woven fabrics, knit fabrics or carpet. Fully-fashioned dyeings are also possible on delicate substrates such as lamb's wool, cashmere, alpaca and mohair.

Accordingly, the invention provides in yet another of its aspects a substrate as hereinabove described dyed or printed with dyestuffs according to the formula (I), their salts or mixtures thereof.

It is to be understood that any reference made above to dyestuffs or their salts in the plural is also to include reference to dyestuff and salt in the singular.

The dyestuffs according to the invention and their salts have good compatibility with known acid dyestuffs. Accordingly, the dyestuffs, their salts or a mixture thereof may be used alone in a dyeing or printing process or as a component in a combination dyeing or printing composition comprising other acid dyestuffs of the same class, that is, acid dyestuffs which possess comparable dyeing properties, e.g., fastness properties and the ability to exhaust from a dyebath onto a substrate. In particular, the dyestuffs according to the invention and their salts may be employed with certain other dyestuffs having suitable chromophores. The proportions in which the dyestuffs are present in a combination dyeing or printing composition is dictated by the particular shade which is to be produced.

Dyestuffs of formula I and their salts are suitable for dyeing natural and synthetic polyamides, that is wool, silk and all types of nylon, on which dyeings with a high level of fastness, in particular good light fastness and good wet fastness (washing at 50° C., alkaline perspiration) are obtained. Tone-in-tone dyeings on the said substrates have excellent quality. All dyeings also show a constant shade under artificial light. The good resistance to hot-pressing and boiling may also be mentioned. One distinct advantage of the new dyestuffs is that they are metal-free.

In the following examples, the temperatures are given in degrees celsius. The percentages and parts are understood to be by weight.

EXAMPLE 1

90 g (0.5 mols) of 2-amino-6-methoxybenzothiazole were dissolved in 450 g of phosphoric acid, 20 g of propionic acid and 260 g of acetic acid, cooled to 0°–5° C. and mixed over the course of one hour with 0.53 mols of 40% nitrosylsulphuric acid. Stirring was effected for a further one hour, and any excess nitrosylsulphuric acid was broken down with 2 g of aminosulphonic acid. The diazonium salt solution thus obtained was added, whilst cooling to 5° to 10° C. and stirring, over the course of one hour, to a solution of 171.5 g (0.5 mols) of 2-(2',6'-dimethylphenylamino)-8-hydroxynaphthalene-6-sulphonic acid and 1.2 g of 30% hydrochloric acid in 300 g of water and 200 g of ice. The pH of this solution was approximately 2.0. To obtain the dyestuff in very fine crystal form, when coupling has ended, the reaction mixture was heated to 70° C., filtered and washed with 10% sodium chloride solution. After drying, the dyestuff of formula I was obtained, wherein $R_1$ (in the 6-position of the benzhthiazole moiety) is methoxy, $R_2$ and $R_6$ are hydrogen, $R_3$ (in the 6-position of the naphthalene nucleus) is —$SO_3H$ and $R_4$ and $R_5$ are methyl. The dyestuff dyed wool, silk and synthetic polyamide fibres tone-in-tone in neutral blue to marine-blue shades. The affinity of this dyestuff was excellent (>95%). The migration of the dyestuff, which is decisive for the levelness of the dyeings, and its fastness, especially light and wet fastness, and also its boiling resistance, were very good.

EXAMPLE 2

In a modification of the procedure of Example 1 the 2-amino-6-methoxybenzothiazole of Example 1 was substituted by 0.5 mols of 2-aminonaphtho[2,1-d]-thiazole-6-sulphonic acid methylamide and the corresponding dyestuff of formula I was thus obtained, wherein $R_1$ (in the 6-position of the fused ring formed from the group $R_2$) signifies methylaminosulphonyl, $R_2$ signifies a group of the formula

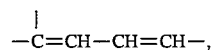

$R_3$ (in the 6-position of the naphthalene nucleus of the coupling component) signifies —$SO_3H$, $R_4$ and $R_5$ signify methyl and $R_6$ signifies hydrogen. The dyestuff dyed polyamide fibre substrates evenly, in blue to marine-blue shades, with good fastness properties.

EXAMPLE 3

In a process analogous to that of Example 1, 2-amino-6-methoxy-benzothiazole-4-sulphonic acid was diazotised and coupled with 2-(2',6'-dimethylphenylamino)-8-hydroxynaphthalene. The dyestuff of formula I was obtained, wherein $R_1$ (in the 4-position of the benzothiazole moiety) is $SO_3H$, $R_2$ (in the 6-position of the benzothiazole moiety) is methoxy, $R_3$ and $R_6$ signify hydrogen, $R_4$ and $R_5$ signify methyl, and the properties thereof were very similar to those of the dyestuff of Example 1.

The dyestuffs of the following Table correspond to formula I. They were produced by a process analogous to that described in Example 1.

In Examples 4 to 23 and 26 to 29, $R_3$ (in the 6-position of the naphthalene nucleus) is —$SO_3H$, $R_6$ is always hydrogen, and $R_4$ and $R_5$ are always methyl; in Examples 24 and 25, $R_3$ and $R_6$ are hydrogen, and $R_4$ and $R_5$ are methyl.

| Ex. no. | $R_1$ | in posn | $R_2$ | in posn | shade |
|---|---|---|---|---|---|
| 4 | H | | —$OC_2H_5$ | 6 | blue |
| 5 | H | | —$OCH_2CHOHC_2H_5$ | 6 | blue |
| 6 | —$CH_3$ | 5 | —$CH_3$ | 6 | blue |
| 7 | —$CH_3$ | 4 | —$NHCOCH_3$ | 7 | blue |
| 8 | —$CH_3$ | 4 | —$CH_3$ | 6 | reddish-blue |
| 9 | —$CH_3$ | 5 | —$CH_3$ | 7 | blue |
| 10 | —$CH_3$ | 4 | —$CH_3$ | 7 | violet |
| 11 | —$OCH_3$ | 5 | —$OCH_3$ | 6 | greenish-blue |
| 12 | —$OCH_3$ | 4 | —$OCH_3$ | 7 | greenish-blue |
| 13 | —$OCH_3$ | 4 | —$OCH_3$ | 6 | greenish-blue |
| 14 | —$OCH_3$ | 4 | —$CH_3$ | 7 | blue |
| 15 | —$OCH_3$ | 4 | —$NHCOCH_3$ | 7 | greenish-blue |
| 16 | —$NHCOC_6H_5$ | 6 | H | | blue |
| 17 | —$N(CH_3)COCH_3$ | 6 | H | | blue |
| 18 | n-$C_4H_9$ | 6 | H | | reddish-blue |
| 19 | —$SO_2N(C_2H_5)C_6H_5$ | 5 | —$CH_3$ | 6 | reddish-blue |
| 20 | —$NHCOCH_3$ | 7 | —$CH_3$ | 6 | blue |
| 21 | —$NHCOCH_3$ | 5 | —$CH_3$ | 6 | reddish-blue |
| 22 | —$NHCOOC_2H_5$ | 6 | H | | greenish-blue |
| 23 | —$NHCOCH_3$ | 6 | H | | blue |
| 24 | —$SO_3H$ | 5 | —$OCH_3$ | 6 | greenish-blue |
| 25 | —$SO_3H$ | 7 | —$OCH_3$ | 6 | greenish-blue |
| 26 | H | 6 | —CH=CH—CH=CH— | | greenish-blue |
| 27 | —$SO_2NH(CH_2)_3OCH_3$ | 6 | —CH=CH—CH=CH— | | greenish-blue |
| 28 | —$NHCOC_2H_5$ | 6 | H | | blue |
| 29 | $CH_3$ | 6 | OH | 5 | blue |

The following Table 2 lists a selection of $\lambda_{max}$ data for dyestuffs of Examples 1 to 29. Unless otherwise indicated, measurements were made in 1% soda solution.

TABLE 2

Absorption maxima data for dyestuffs of formula (I)

| Example | $\lambda_{max}$ |
|---|---|
| 1 | 585 |
| 2 | 631[a] |
| 3 | 585 |
| 4 | 584 |
| 6 | 584 |
| 8 | 585 |
| 9 | 558 |
| 10 | 510 |
| 11 | 530 |
| 12 | 530 |
| 13 | 539 |
| 14 | 532 |
| 15 | 555 |
| 16 | 572 |
| 17 | 523 |
| 18 | 564 |
| 19 | 560 |
| 23 | 631[a] |
| 24 | 590 |
| 25 | 590 |
| 28 | 631[a] |
| 29 | 590[a] |

[a] Measurement made in Dimethylformamide + 1% acetic acid a Measurement made in Dimethylformamide + 1% acetic acid

EXAMPLE 30

104 parts (0.5 mols) of the compound of formula II, wherein $R_1$ and $R_2$ together signify the divalent radical —$CH_2OCH_2O$— (carbon bonded at the 5-position and oxygen at the 6-position of the benzothiazole moiety), were dissolved in 450 parts of phosphoric acid, 20 parts of propionic acid and 260 parts of acetic acid, cooled to 0°–5° C. and mixed over the course of one hour with 0.53 mols of 40% nitrosylsulphuric acid. Stirring continued for a further one hour, and any excess nitrosylsulphuric acid was broken down with 2 parts of aminosulphonic acid. The diazonium salt solution thus obtained was added, whilst cooling to 5° to 10° C. and stirring, over the course of one hour, to a solution of 171.5 parts (0.5 mols) of 2-(2',6'-dimethylphenylamino)-8-hydroxynaphthalene-6-sulphonic acid and 1.2 parts of 30% hydrochloric acid in 300 parts of water and 200 parts of ice. The pH of this solution was approximately 2.0. In order to obtain the dyestuff in very fine crystal form, when coupling has ended, the reaction mixture was heated to 70° C., filtered and washed with 10% sodium chloride solution. After drying, the dyestuff of the following formula was obtained.

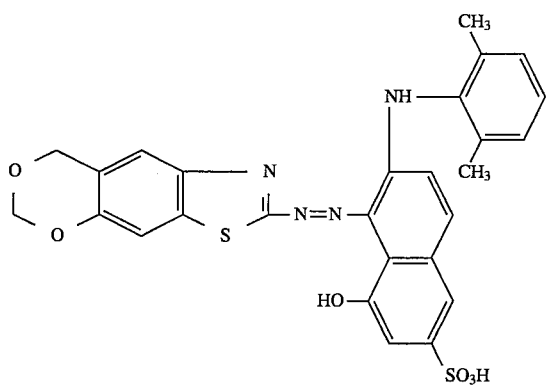

The $\lambda_{max.}$ value of this dyestuff (measured in dimethylformamide + 1% acetic acid) was 624 nm. It dyed wool, silk and synthetic polyamide fibre material tone-in-tone in neutral blue to marine-blue shades. The affinity of the dyestuff was excellent (>95%). The migration of the dyestuff, which is decisive for the levelness of the dyeings and its fastness, especially light and wet fastness, and also its boiling resistance, were very good.

The dyestuffs of the following Table 3 correspond to formula I and were produced according to a process described in Example 30. In the following Examples, $R_3$ (in the 6-position of the naphthalene nucleus) is —$SO_3H$, $R_6$ is always hydrogen, $R_4$ and $R_5$ are always methyl. The ring formed by $R_1$ and $R_2$ is always bonded in the 5- and 6-position of the benzothiazole moiety.

TABLE 3

| Ex. No. | $R_1$ and $R_2$ together | shade |
|---|---|---|
| 31 |  | violet |
| 32 |  | marine-blue |
| 33 |  | violet-blue |
| 34 |  | violet-blue |
| 35 |  | marine-blue |

The $\lambda_{max.}$ values of Examples 31, 32 and 34 are 619 nm, 596 nm and 619 nm respectively (measured in dimethylformamide + 1% acetic acid).

APPLICATION EXAMPLE 100 parts of wool gabardine were added to a dye bath at a temperature of 50° C., consisting of
4000 parts of water,
10 parts of Glauber's salt (calcined),
1.5 parts of a commercial, weakly cationic levelling agent, that has affinity for anionic dyestuffs, based on a polyglycol ether (the solution of which, diluted with water had a pH of ca. 8) and 2.6 parts of the dyestuff according to Example 1, which has been set at pH 4.5–5 with 3 parts of 80% acetic acid were mixed together. After 15 minutes at 50° C., the dye bath was heated to 98° C. over the course of 30–45 minutes, and was left at the boil for 30–45 minutes. Water which evaporated during the dyeing process was continuously replaced. Cooling to 70° C. was subsequently effected over the course of 20 minutes. The resultant dyeing was rinsed with warm and cold water and dried in a drying chamber under moderate conditions. A marine-blue wool dyeing with good light and wet fastness was produced.

Instead of the dyestuff of Example 1, the dyestuffs of Examples 2 to 35 may also be used in accordance with the above application Example, in a respective quantity of 0.2 to 4 parts of dyestuff, depending on the desired depth of shade.

I claim:
1. The acidic monoazo dyestuff of formula I

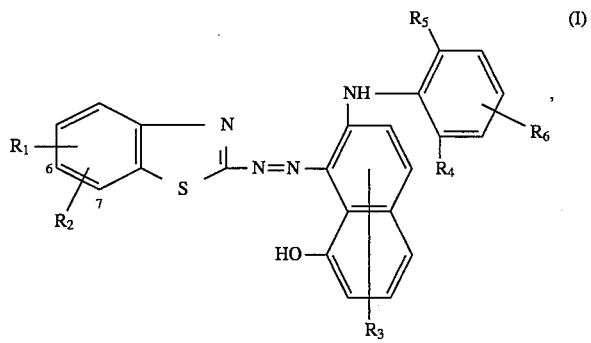

or a salt thereof wherein

R$_1$ signifies hydrogen, halogen, cyano, thiocyano, nitro, acyl, acyloxy, acylamino, alkyl, alkoxy, substituted alkyl or alkoxy or a sulphonic acid group, R$_2$ signifies hydrogen, halogen, selected from fluorine, chlorine, bromine and iodine, alkyl, alkoxy, hydroxyalkyl, a sulphonic acid group, or a divalent radical of formula —CH═CH—CH═CH— or —CH═CH—CH═CH— with an R$_1$ substituent which divalent radical is bonded at the 6- and 7-position of the benzothiazole moiety, or R$_1$ and R$_2$ together form an unsubstituted iso- or heterocyclic 5 or 6 membered aliphatic ring, a 5 or 6-membered heteroaromatic ring or said rings substituted at carbon by an alkyl group having 1 to 4 carbon atoms, a halogen selected from fluorine, chlorine, bromine or iodine, a hydroxy group or ═O, wherein any heterocyclic ring possesses from 1 to 3 heteroatoms, R$_3$ signifies hydrogen or a sulphonic acid group, R$_4$ and R$_5$, each independently of the other, signify alkyl or alkoxy, R$_6$ signifies hydrogen, halogen, cyano, thiocyano, nitro, acyl, acyloxy, acylamino, alkyl, alkoxy, substituted alkyl or alkoxy or a sulphonic acid group, wherein the dyestuff bears only one sulphonic acid group.

2. Acidic monoazo dyestuff according to claim 1 or a salt thereof wherein

R$_1$ represents a methyl group, an alkoxy group selected from methoxy, ethoxy, propoxy and butoxy, an amido group having from 1 to 8 carbon atoms, an alkoxycarbonylamino group having from 1 to 8 carbon atoms, a benzoylamino group, an alkylaminosulphonyl group having from 1 to 4 carbon atoms, a cyclohexylaminosulphonyl group or a phenylaminosulphonyl group, R$_2$ signifies a hydrogen atom, a methyl group, an alkoxy group selected from methoxy, ethoxy, propoxy and butoxy, or a group of the formula —CH═CH—CH═CH— which is bonded at the 6- and 7-position to the benzothiazole moiety, R$_1$ and R$_2$ together represent a ring as defined in claim 1 connected to the benzothiazole moiety at the 5- and 6-positions or the 6- and 7-positions, R$_3$ signifies a —SO$_3$H group which is bonded at the 6-position of the naphthalene nucleus, R$_4$ and R$_5$, independently of one another, signify methyl, ethyl, isopropyl or a t-butyl group and R$_6$ signifies a hydrogen atom.

3. Acidic monoazo dyestuff according to claim 1 having the formula or its salt.

4. Acidic monoazo dyestuff according to claim 1 or a salt thereof wherein the ring formed by R$_1$ and R$_2$ together is a heterocycle comprising 1 or 2 oxygen, nitrogen or sulphur atoms.

5. Acidic monoazo dyestuff according to claim 1 wherein the ring formed by R$_1$ and R$_2$ together is an aliphatic heterocycle unsubstituted or substituted with ═O, bonded at the 5- and 6-position of the benzothiazole moiety, in which the hetero atoms are oxygen and at least one ring oxygen atom is bonded directly to the carbon atom at the 6-position of the benzothiazole moiety.

6. Acidic monoazo dyestuff according to claim 4 wherein the ring formed by R$_1$ and R$_2$ together is an aliphatic heterocycle unsubstituted or substituted with ═O, bonded at the 5- and 6-position of the benzothiazole moiety, in which the hetero atoms are oxygen and at least one ring oxygen atom is bonded directly to the carbon atom at the 6-position of the benzothiazole moiety.

7. Acidic monoazo dyestuff according to claim 1 according to the formula and its salt.

8. Process for the production of the acidic monoazo dyestuffs of formula (I) defined in claim 1 and their salts wherein a diazotised amine of formula II (II)

is coupled with a compound of formula III.

(III)

9. A process of dyeing or printing fibrous materials consisting of natural and/or synthetic polyamides by applying thereto dyestuffs according to formula I as defined in claim 1, their salts or mixtures thereof.

10. Fibrous materials consisting of natural and/or synthetic polyamides dyed with dyestuffs of formula (I) as defined in claim 1, their salts or mixtures thereof.

* * * * *